(12) United States Patent
Hause et al.

(10) Patent No.: US 8,160,210 B2
(45) Date of Patent: Apr. 17, 2012

(54) CONVERSATION OUTCOME ENHANCEMENT METHOD AND APPARATUS

(75) Inventors: Leonard C. Hause, Austin, TX (US); Andrew J. Aftelak, Palatine, IL (US); George N. Maracas, Phoenix, AZ (US); James Kefeng Zhou, Beijing (CN); Robert A. Zurek, Antioch, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1501 days.

(21) Appl. No.: 11/620,965

(22) Filed: Jan. 8, 2007

(65) Prior Publication Data
US 2008/0167878 A1 Jul. 10, 2008

(51) Int. Cl. *H04M 11/04* (2006.01)
(52) U.S. Cl. ........................... 379/38; 704/200.1
(58) Field of Classification Search ............... 379/38, 379/39, 42; 704/200.1
See application file for complete search history.

(56) References Cited

U.S. PATENT DOCUMENTS

| | | | |
|---|---|---|---|
| 6,959,080 B2 * | 10/2005 | Dezonno et al. | 379/265.07 |
| 7,844,301 B2 * | 11/2010 | Lee et al. | 455/566 |
| 8,019,050 B2 * | 9/2011 | Mactavish et al. | 379/22.08 |
| 2004/0141605 A1 | 7/2004 | Chen et al. | |
| 2004/0213402 A1 * | 10/2004 | Ruetschi | 379/388.06 |
| 2005/0228236 A1 | 10/2005 | Diederich et al. | |
| 2006/0233347 A1 * | 10/2006 | Tong et al. | 379/265.06 |
| 2007/0071206 A1 * | 3/2007 | Gainsboro et al. | 379/168 |
| 2007/0121824 A1 * | 5/2007 | Agapi et al. | 379/88.18 |
| 2008/0101557 A1 * | 5/2008 | Boss et al. | 379/88.08 |

* cited by examiner

*Primary Examiner* — Olisa Anwah

(57) ABSTRACT

A system [100] is provided that includes a first set of sensors [140] to sense a set of conditions of at least one participant in a conversation and generate raw data corresponding to the sensed set of conditions. A first aggregation engine [160] aggregates the raw data and outputs a file corresponding to the raw data. A heuristic engine [175] receives the file and compares the raw data with predetermined state data and outputs a state based on a comparison of the raw data and the predetermined state data. A feedback device [180] determines a corrective action to enhance an outcome of the conversation based on the state.

14 Claims, 4 Drawing Sheets

CONVERSATION OUTCOME ENHANCEMENT METHOD AND APPARATUS

TECHNICAL FIELD

This invention relates generally to conversation analysis systems.

BACKGROUND

Video conferences and telephone conference calls often take place involving numerous participants. Unfortunately, in the event that a large number of participants take part in the video conference or telephone conference call, certain participants sometimes tend to dominate the conversation, and other participants become distracted or stop paying attention for periods of time. Because of the uneven participation, there is a possibility that the video conference or telephone conference call will not be successful. For example, in a collaboration meeting among different entities of a management team, it may be desirable for marketers, attorneys, and management to all engage in a conversation so that everyone knows all of the other participants' ideas about a proposed new product line. However, if the marketers dominate the conversation and the lawyers are distracted or are not active participants, then the conference call may not be successful.

When a debate or conference occurs at a single site among a small group of participants, such as candidates for a public office, a moderator may be physically present to control the flow of the debate/conversation. When the participants are physically remotely located relative to each other and/or an audience (such that they are out of range of ordinary human communication and discourse), on the other hand, it is difficult or practically impossible for one person to monitor the debate/conversation and effectively manage the communication flow.

There are systems in the art for monitoring the state of a person and providing feedback. For example, there is a system in the art for monitoring a driver of an automobile. Measurements of the driver's characteristics, including monitored head position, tilt, body activity level, eyelid blinking, breathing and body temperature are taken and, based on the measurements, the system can determine whether the driver is falling asleep or is otherwise too drowsy to drive the automobile. In the event that the driver is falling asleep, a corrective action may be taken, such as sounding an alarm to alert the driver that he/she is falling asleep. This system, however, is designed only to monitor a single person, i.e., the driver, and the decision regarding the corrective action to occur is decided locally by some processing device within the automobile.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
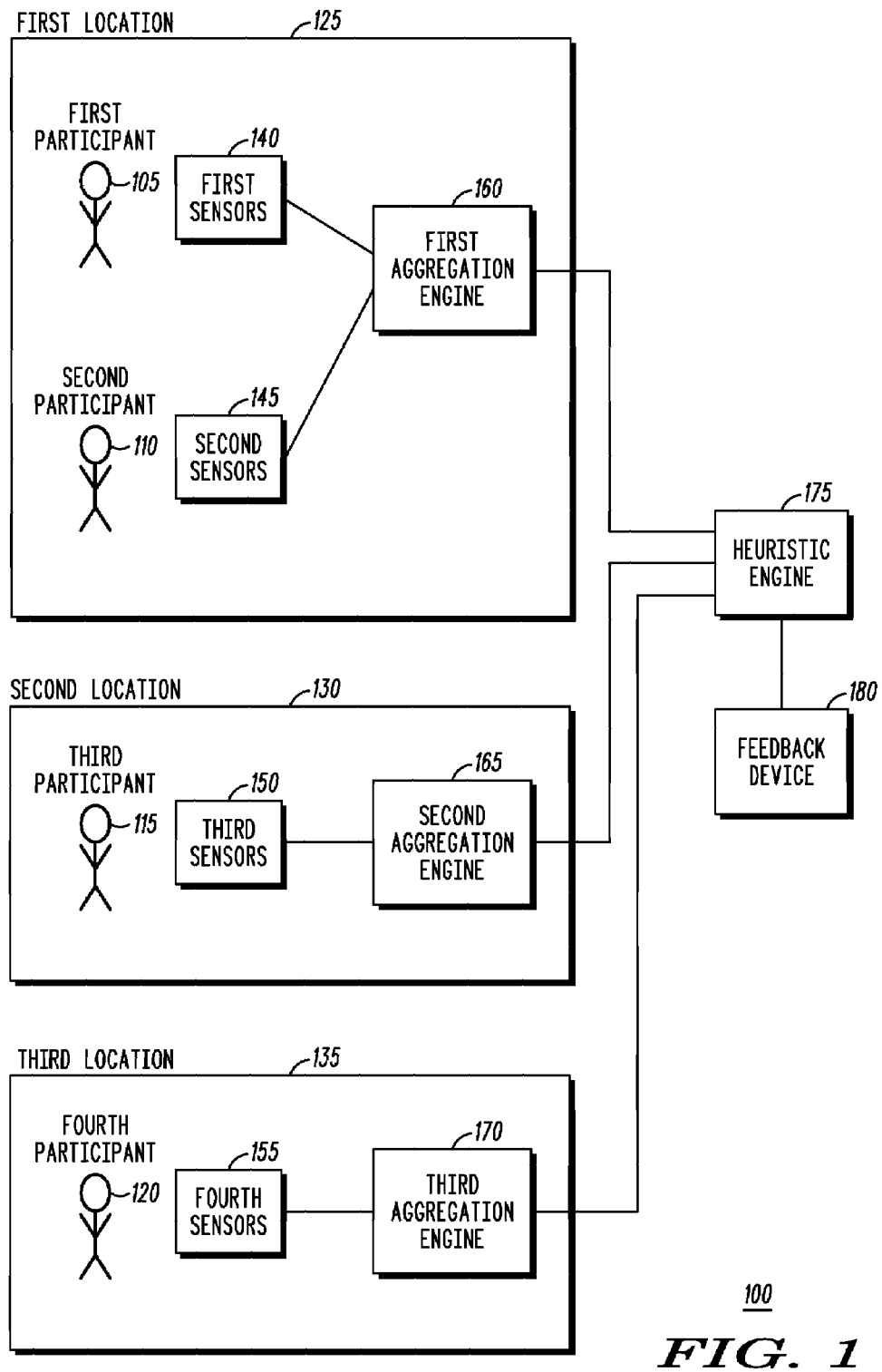
FIG. 1 illustrates a conversation monitoring system according to at least one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a method and system for monitoring participants and/or listeners in a conversation is provided. The conversation may include video and audio, such as a video-conference, or may include just audio, such as an audio teleconference. The conversation may occur locally, such as within a single conference room. Alternatively, the conversation may occur between participants located remote from each other such as, for example, when one participant is in Chicago, another is in Los Angeles, and a third is in Miami or some other physically remote location relative to the other two participants.

Various data are acquired from individual participants, or from groups of participants. The data is used to monitor the flow of the conversation as well as to determine whether other participants are engaged or are distracted. Various factors such as body temperature, stress levels in a speaker's voice, carbon dioxide ($CO_2$) levels in the air around a participant, blood pressure, conversation pauses, detection of side conversations, and the spectral analysis of spoken words may be measured. Other factors of interest as may be available and/or monitorable may also be considered as desired.

These factors are aggregated by an aggregation engine and then compiled into a file, such as an Extensible Markup Language (XML) file. The aggregation engine may be located locally where the participants are located. In the event that participants are located at physically remote locations, a separate aggregation engine may be utilized at each remote location. The output file from the aggregation engine is transmitted to a heuristic engine. A single heuristic engine may be utilized and may receive the aggregation files from all of the relevant aggregation engines. The heuristic engine may be located remote to the respective locations where each of the participants is located. Alternatively, the heuristic engine may be located at the same location as one of the participants in the conversation.

The heuristic engine contains various predetermined rules of choice for analyzing the data received in the file from the aggregation engine. By comparing the data in the aggregation file, the heuristic engine determines a state for each participant or for a group of participants. For example, the state may be "participant A is sleeping," or "participant B is dominating the conversation." The state is output to a feedback device which may take corrective action based on the state. The corrective action may include displaying an avatar on the sleeping participant's personal digital assistant ("PDA"), cell phone, or computer requesting that participant to wake up. Alternatively, the avatar may be displayed to a person designated as a moderator for the conversation. In the event that the conversation is a lecture where one person does most of the talking, the avatar may be displayed to the lecturer to inform that, for example, a student is falling asleep. The lecturer may then brighten the light level in a room in which the lecture is taking place, change subjects, increase speaking volume, lower the ambient temperature, increase an availability of oxygen in the room, or take some other action to increase attention and/or participation.

FIG. 1 illustrates a conversation monitoring system 100 according to at least one embodiment of the invention. As shown, a first participant 105, a second participant 110, a third participant 115, and a fourth participant 120 all take part in a conversation, such as a video-conference or a telephone conference call. The first participant 105 and the second participant 110 are located at a first location 125, the third participant 115 is located at a second location 130, and the fourth participant 120 is located at a third location 135. The first location 125, the second location 130, and the third location 135 may be physically remote from each other. For example, they could each be located in different rooms, buildings, or even in different cities. Although four participants are shown in FIG. 1, it should be appreciated that more or fewer than four participants may participate in the conversation.

The first location 125 includes first sensors 140 and second sensors 145. The first sensors 140 are utilized to take measurements corresponding to the first participant 105, and the second sensors 145 are utilized to take measurements of the second participant 110. In other embodiments, only a single set of sensors is utilized to take measurements from both the first participant 105 and the second participant 110. The second location 130 includes a set of third sensors 150 to take measurements from the third participant 115, and the third location includes fourth sensors 155 to take measurements from the fourth participant 120.

Figure 2:
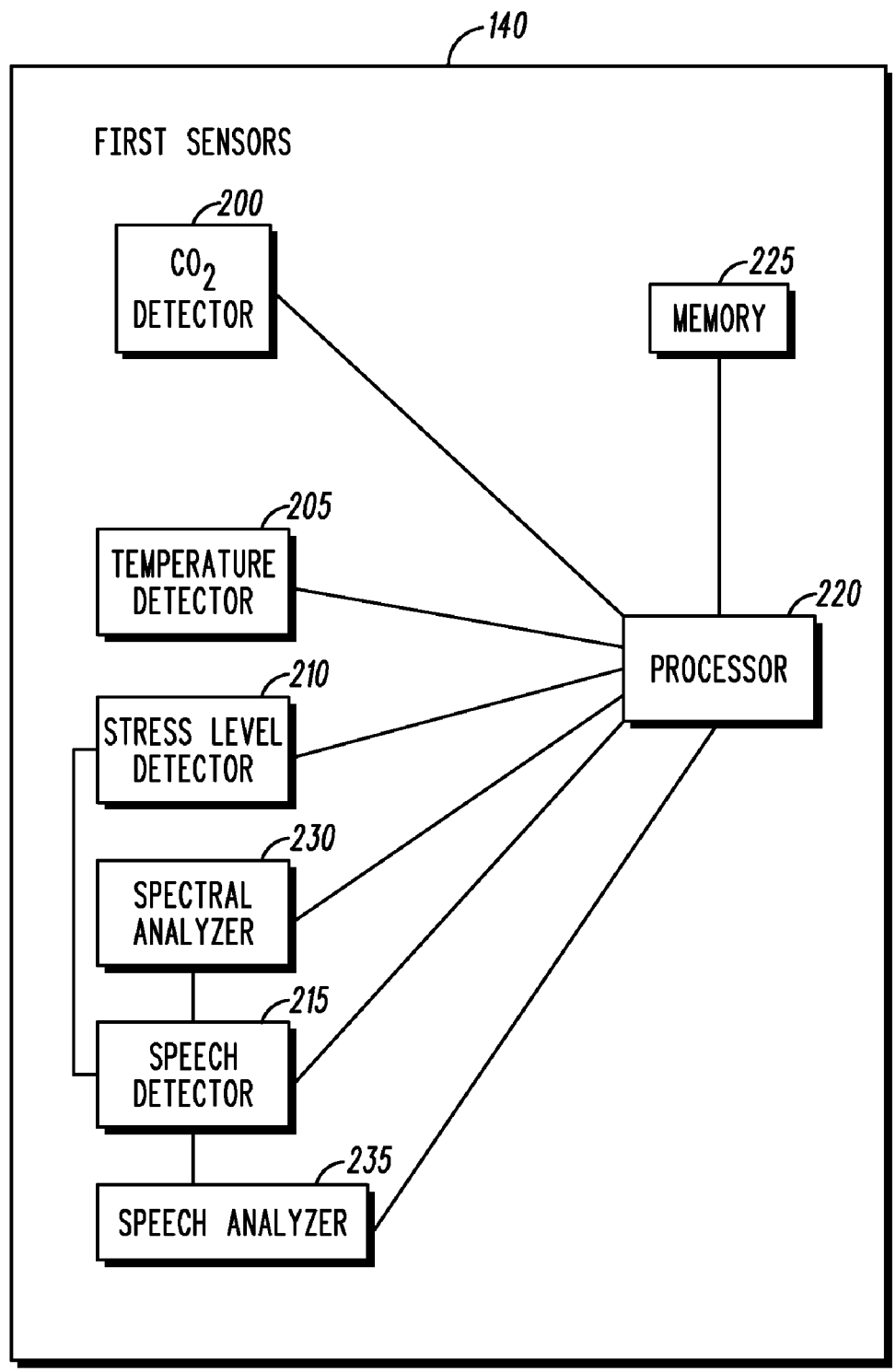
FIG. 2 illustrates exemplary elements within the first sensors according to at least one embodiment of the invention.

FIG. 2 illustrates exemplary elements within the first sensors 140 according to at least one embodiment of the invention. The first sensors 140 may also include a $CO_2$ detector 200 to detect a level of $CO_2$ in the first participant's breath. The $CO_2$ detector 200 may be located in, for example, a telephone being utilized by the first participant and may measure the $CO_2$ content of the first participant's breath. The first sensors 140 may also include a temperature detector 205, such as a thermometer, or other device to measure the first participant's temperature. Based on the first participant's body temperature and/or the $CO_2$ level, a determination may be made as to whether the first participant is attentive to the conversation or is drowsy/falling asleep. The first sensors 140 may also include a stress level detector 210 to measure stress levels in the first participant's spoken voice. To do this, the first sensors 140 may include a speech detector 215 and a processor 220 to compare measured characteristics of the first participant's spoken voice with pre-stored values for the first participant stored in a memory 225.

A spectral analyzer 230 may be included to analyze the first participant's speech. For example, the spectral analyzer 230 may compare detected characteristics of certain spoken words or parts of words, such as phonemes, against pre-stored characteristics for the words or phonemes. The pre-stored characteristics for the words or phonemes may be stored in the memory 225. It is anticipated that other portions of speech such as formants, speech functions, and the like may be used as well. It is also anticipated that temporal characteristics of the speech could be used to improve the accuracy of the speech analysis.

The first sensors 140 also include a speech analyzer 235 in communication with the speech detector 215. The speech analyzer 235 may be utilized to analyze detected speech, for example, to detect presence of side conversations. A side conversation is a conversation between two or more persons at a location that is not intended to be heard by the remaining participants of the conference call. For example, if the first participant 105 and the second participant 110 are whispering among themselves, this may be detected as a side conversation. The presence of side conversations may indicate that participants are not paying attention or fully participating in the conversation.

As shown in FIG. 2, each of the $CO_2$ detector 200, the temperature detector 205, the stress level detector 210, the spectral analyzer 230, the speech detector 215, the speech analyzer 235, and the memory 225 may be in communication with the processor 220. It should be appreciated that the list of various detectors/analyzers shown in FIG. 2 is not exhaustive and additional detectors/analyzers may also be utilized. Also, some of the detector/analyzers may not be included in the first sensors 140, depending on the application. The second sensors 145, third sensors 150, and fourth sensors 155 may each contain the same, or different, detectors/analyzers as the first sensors 140.

Referring again to FIG. 1, the first location 125 includes a first aggregation engine 160. The first aggregation engine 160 has a function of acquiring the data from the first sensors 140 and the second sensors 145 and compiling this data into a file having a predetermined format. For example, the data may be compiled into an XML file. The second aggregation engine 165 and the third aggregation engine 170 of the second location 130 and the third location 135, respectively, perform functions similar to that of the first aggregation engine 160.

The first aggregation engine 160, the second aggregation engine 165, and the third aggregation engine 170 output their files to a heuristic engine 175. The heuristic engine 175 may be remote from each of the first location 125, the second location 130, and the third location 135. Alternatively, the heuristic engine 175 may be located at one of the first location 125, the second location 130, and the third location 135. In other embodiments, multiple heuristic engines may be utilized.

The heuristic engine 175 compares the received data in the files against predetermined data corresponding to various states such as "sleepy," "annoyed," and "overly dominant" (i.e., a speaker who is dominating the conversation). After the comparison, the heuristic engine 175 outputs a state for each individual participant, or select groups of participants, or the entire set of participants. The heuristic engine is also adapted to identify a level of consensus for at least a topic of discussion based on sensed conditions.

The state(s) is output to a feedback device. Upon receiving the state(s), the feedback device 180 takes corrective action when appropriate to alter the conversation. For example, the feedback device 180 may cause an avatar on a personal digital assistant (PDA) or computer corresponding to the first participant 105 to indicate that the first participant is drowsy. Based on this information the first participant may stand up and walk around, drink a caffeinated beverage, or perform some action in an effort to reduce drowsiness in order to be a more effective participant in the conversation.

Alternatively, the avatar may be displayed to a person designated as a moderator for the conversation. In the event that the conversation is a lecture where one person does most of the talking, the avatar may be displayed to the lecturer to inform that, for example, a particular student (or, more generally, a student) is falling asleep. The lecturer may then brighten the light level is a room in which the lecture is taking place, change the conversation subject, increase speaking volume, or take some other action to increase participation. The participation level of a particular participant may be determined by monitoring of a particular set of conditions for the particular participant over a time interval.

Figure 3:
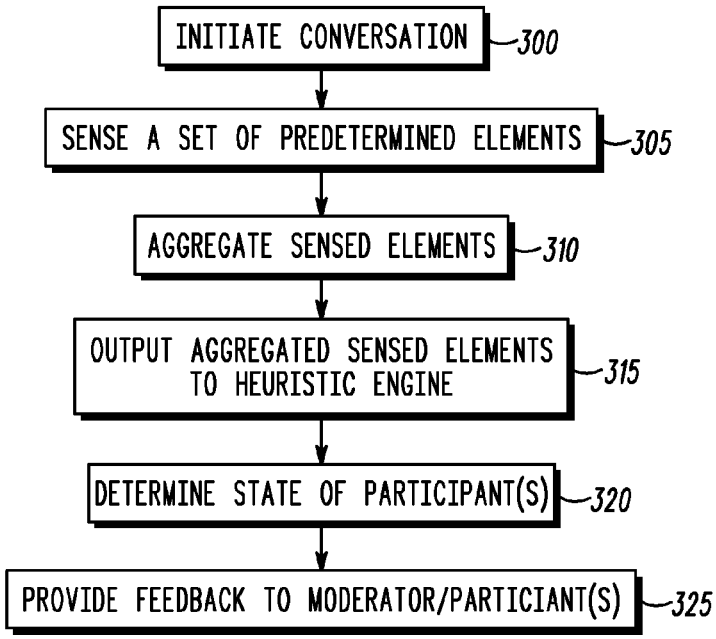
FIG. 3 illustrates a method according to at least one embodiment of the invention.

FIG. 3 illustrates a method according to at least one embodiment of the invention. As shown, a conversation is initiated at operation 300. Next, a set of predetermined elements are sensed at operation 305. As discussed above with respect to FIGS. 1 and 2, the sensed elements may include body temperature, stress levels in a speaker's voice, carbon dioxide ($CO_2$) levels in the air around a participant, blood pressure, conversation pauses, detection of side conversations, and the spectral analysis of spoken words. These and other factors may be measured, as well as any other relevant measured criteria.

At operation 310, the sensed elements are aggregated. This is performed by an aggregation engine, such as the first aggregation engine 160, the second aggregation engine 165, and the third aggregation engine 170. When aggregated, data corresponding to the sensed elements is complied into a common data format. Next, at operation 315, the aggregated data corresponding to the sensed elements is output to a heuristic engine, such as the heuristic engine 175 shown in FIG. 1. At operation 320, the state of the participants is determined by the heuristic engine. Finally, at operation 325, feedback is provided to the moderator/participants based on the state. After receiving this feedback, the conversation may be altered to improve participant, or alertness of the participants, in an effort to improve the effectiveness of the conversation. Those skilled in the art will recognize and understand that such a heuristic engine comprises a well-understood area of endeavor. As the present teachings are not overly sensitive to the selection of any particular architectural or functional approach in this regard, for the sake of brevity further elaboration will not be provided here except where appropriate.

Figure 4:
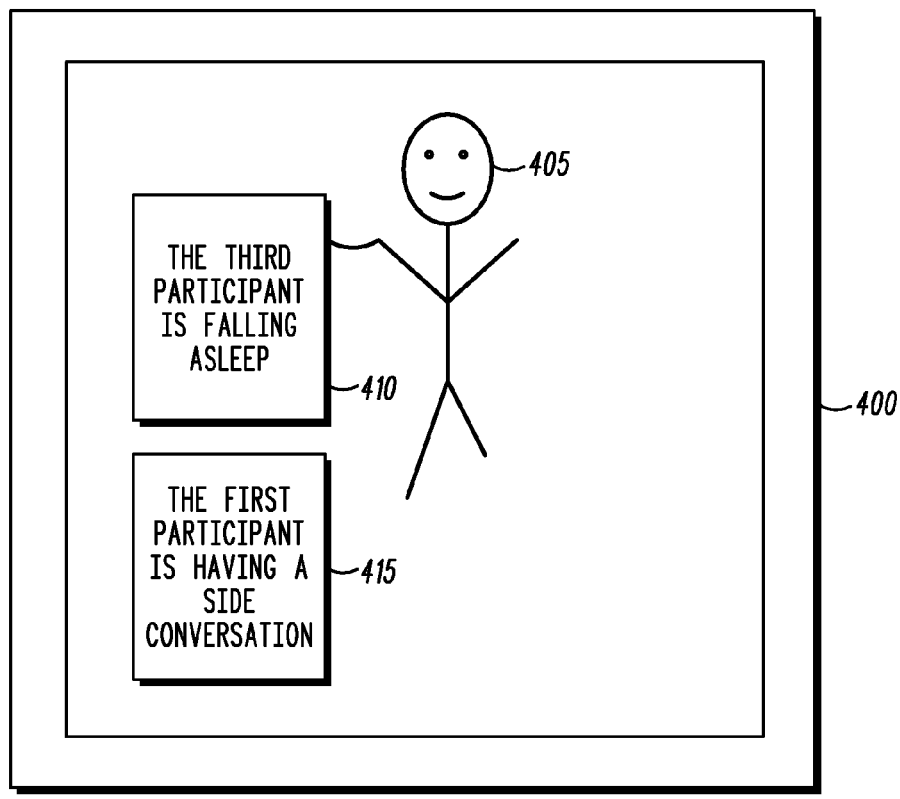
FIG. 4 illustrates an electronic communications device according to at least one embodiment of the invention.

FIG. 4 illustrates an electronic communications device 400 according to at least one embodiment of the invention. Each, or some, of the participants in the group conversation may utilize their own electronics communications device 400 during the conversation. The electronics communications device 400 may comprise, for example, a computer, a PDA, or a cellular telephone. The electronics communications device 400 may be utilized to display an avatar 405 and a message for the participant. The message to be displayed may be determined by the feedback device 180. For example, the avatar may display a first message 410 that "the third participant is falling asleep" or a second message 415 that "the first participant is having a side conversation."

Figure 5:
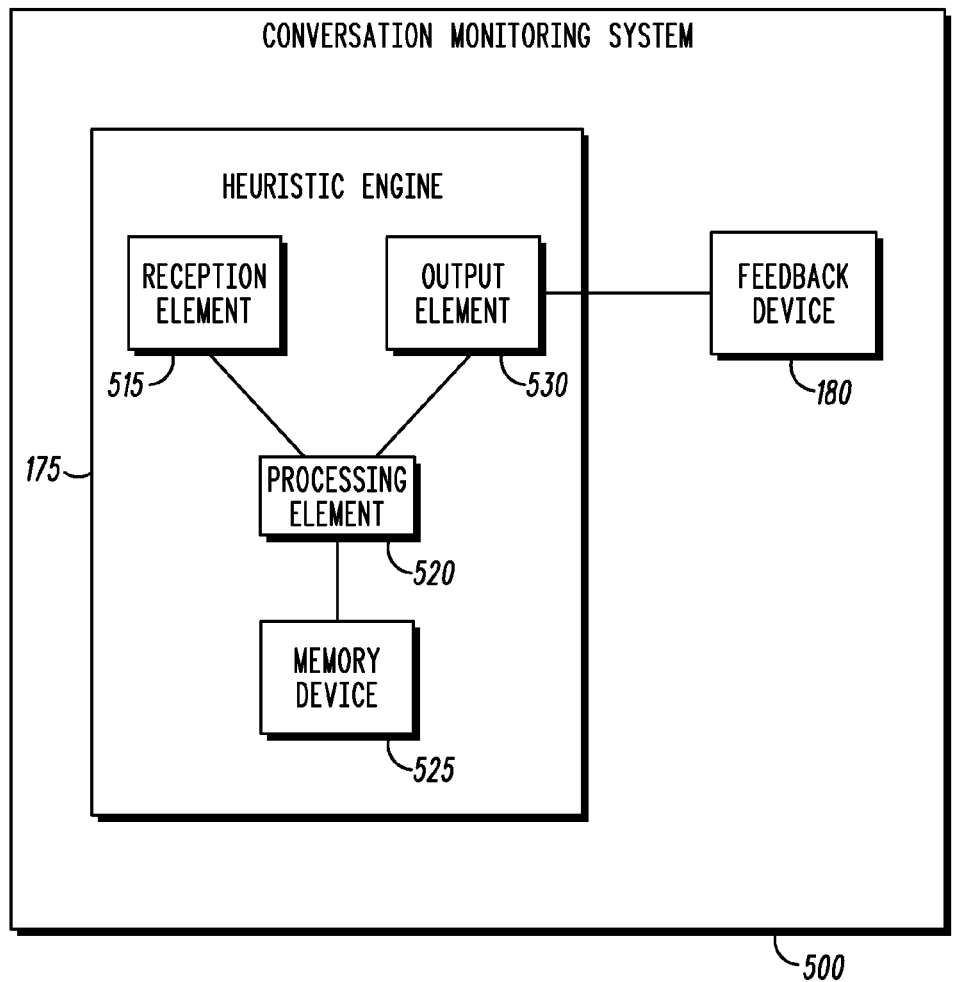
FIG. 5 illustrates a conversation monitoring system according to at least one embodiment of the invention.

FIG. 5 illustrates a conversation monitoring system 500 according to at least one embodiment of the invention. As shown, the conversation monitoring system includes a heuristic engine 175 and a feedback device 180. The heuristic engine includes a reception element 515 and a processing element 520. The reception element 515 receives a file comprising raw data corresponding to a sensed set of conditions for at least one participant in a conversation. The file containing the raw data may be generated by a set of sensors and aggregation engines such as those discussed above with respect to FIG. 1.

The processing element 520 compares the raw data with predetermined state data. The predetermined state data may be stored in a memory device 525. The processing element 520 is in communication with an output element 530 that outputs a state based on the comparison of the raw data and the predetermined state data. The feedback device 180 determines a corrective action to enhance an outcome of the conversation based on the state. The feedback device 180 may indicate a representation of the corrective action to at least one of: the at least one participant and a moderator of the conversation. In some embodiments, the representation of the corrective action is indicated via a visual display. The corrective action might also be indicated via an audible signal, a haptic signal, or any other medium or modality of choice.

Accordingly, these teachings are seen to provide an efficient way of monitoring a conversation and taking corrective action to improve participation or effectiveness according to some other criteria. Unlike prior systems, these teachings provide the aggregate from multiple sensors at multiple different locations for multiple participants and display an avatar or instant message to inform one or more participants of corrective action to take. This entire process can be automated so that a single person is not burdened by having to determine which corrective actions to take when a conversation is one-sided or is experiencing uneven participation. Moreover, feedback may be provided to multiple participants in a conversation at a single time to therefore quickly enhance the conversation to ensure that the conservation is effective.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A system, comprising:
   a first set of sensors to sense a set of conditions of at least one participant in a conversation and generate raw data corresponding to the set of conditions;
   a first aggregation engine to aggregate the raw data and output a file corresponding to the raw data;
   a heuristic engine to receive the file and compare the raw data with predetermined state data and output a state based on a comparison of the raw data and the predetermined state data, wherein the heuristic engine is adapted to identify a level of consensus for at least a topic of discussion based on the set of conditions sensed by the first set of sensors; and
   a feedback device to determine a corrective action to enhance an outcome of the conversation based on the state.

2. The system of claim 1, wherein the first set of sensors comprise at least one of: a carbon dioxide ($CO_2$) detector, a temperature detector, a stress level detector, a spectral analyzer, a speech detector, and a speech analyzer.

3. The system of claim 1 further comprising a second set of sensors to sense a second set of conditions of at least a second participant in the conversation and generate second raw data corresponding to the sensed second set of conditions, and a second aggregation engine to aggregate the second raw data corresponding to at least the second participant and output a second file corresponding to the second raw data.

4. The system of claim 3, wherein the at least the second participant and the second set of sensors are located physically remote from the first set of sensors.

5. The system of claim 1, wherein a representation of at least one of the state and the corrective action is indicated to at least one of the at least one participant and a moderator of the conversation.

6. The system of claim 5, wherein the representation of at least one of the state and the corrective action is indicated via an avatar displayed on a visual display.

7. The system of claim 1,
   wherein the corrective action comprises at least one of: changing a subject of the conversation, changing a volume level of the conversation, and changing lighting conditions in an area in which at least one of the at least one participant is located.

8. A method, comprising:
sensing a set of conditions of at least one participant in a conversation;
generating raw data corresponding to the set of conditions;
aggregating the raw data;
comparing the raw data with predetermined state data;
outputting a state based on a comparison of the raw data and the predetermined state data;
determining a corrective action to enhance an outcome of the conversation based on the state; and
identifying a participation level of a particular participant of the at least one participant based on monitoring of a particular sensed set of conditions for the particular participant over a time interval.

9. A method, comprising:
sensing a set of conditions of at least one participant in a conversation by sensing at least one of: a carbon dioxide ($CO_2$) level of the at least one participant, a temperature in an area in which at least one of the at least one participant is located, a stress level of the at least one participant, a detection of a side conversation, and a spectral analysis of speech detected during the conversation;
generating raw data corresponding to the set of conditions;
aggregating the raw data;
comparing the raw data with predetermined state data;
outputting a state based on a comparison of the raw data and the predetermined state data;
determining a corrective action to enhance an outcome of the conversation based on the state; and
identifying a side conversation based on the spectral analysis of the speech detected during the conversation.

10. The method of claim 8, further comprising sensing a second set of conditions of at least a second participant in the conversation, generating second raw data corresponding to the second set of conditions, aggregating the second raw data corresponding to at least the second participant, and outputting a second file corresponding to the second raw data.

11. The method of claim 10, wherein the at least the second participant and the second set of sensors are located physically remote from the first set of sensors.

12. The method of claim 8, further comprising indicating a representation of the corrective action to at least one of: the at least one participant and a moderator of the conversation.

13. The method of claim 12, wherein the indicating the representation of the corrective action is indicated via an avatar displayed on a visual display.

14. The system of claim 1, wherein the output state comprises at least one of: sleepy, annoyed and overly dominant.

* * * * *